(12) United States Patent
Tan et al.

(10) Patent No.: US 6,850,526 B2
(45) Date of Patent: Feb. 1, 2005

(54) METHODS AND APPARATUS FOR EXTENDING THE TRANSMISSION RANGE OF UTOPIA INTERFACES AND UTOPIA PACKET INTERFACES

(75) Inventors: Zhenping Tan, San Jose, CA (US); Zheng Liu, Saratoga, CA (US); Jian Liu, Livermore, CA (US); Ronald P. Novick, Orange, CT (US)

(73) Assignee: TranSwitch Corporation, Shelton, CT (US)

( * ) Notice: Subject to any disclaimer, the term of this patent is extended or adjusted under 35 U.S.C. 154(b) by 556 days.

(21) Appl. No.: 09/900,307

(22) Filed: Jul. 6, 2001

(65) Prior Publication Data

US 2004/0202179 A1 Oct. 14, 2004

(51) Int. Cl.[7] ............................. H04L 12/28; H04J 3/16; H04J 3/24
(52) U.S. Cl. .................... 370/395.6; 370/413; 370/469; 370/474
(58) Field of Search ........................... 370/395.1, 395.4, 370/395.51, 412–413, 449, 469, 395.6, 474; 710/52, 57; 703/14, 19, 24; 718/100

(56) References Cited

U.S. PATENT DOCUMENTS

| | | | | |
|---|---|---|---|---|
| 6,256,308 B1 | * | 7/2001 | Carlsson | 370/395 |
| 6,452,927 B1 | * | 9/2002 | Rich | 370/395.1 |
| 6,693,911 B2 | * | 2/2004 | Yamanaka | 370/395.3 |
| 6,700,872 B1 | * | 3/2004 | Hann et al. | 370/241 |

FOREIGN PATENT DOCUMENTS

US   PCT/US99/23559   10/1999   .......... H04L/12/42

OTHER PUBLICATIONS

*UTOPIA Specification Level 1, Version 2.01, af–phy–0017.000*, The ATM Forum Technical Committee, Mar. 21, 1994.
*UTOPIA Level 2, Version 1.0, af–phy–0039.000*, The ATM Forum Technical Committee, Jun. 1995.
*UTOPIA 3 Physical Layer Interface, af–phy–0136.000*, The ATM Forum Technical Committee, Nov. 1999.

* cited by examiner

Primary Examiner—Duc Ho
(74) Attorney, Agent, or Firm—Gordon & Jacobson, P.C.

(57) ABSTRACT

Methods and apparatus for extending the transmission range of a UTOPIA ATM (or packet) interface include providing two UTOPIA extension devices, one for coupling a PHY layer device to a transmission cloud and one for coupling an ATM layer (or LINK layer) device to the transmission cloud. Each device includes a UTOPIA interface emulator, a link controller, and a media transceiver. The media transceiver can be made to support various media such as a backplane, copper cable, optical fiber, or a wireless medium. The UTOPIA extension device preferably includes a UTOPIA inlet buffer, a UTOPIA outlet buffer, an inlet clock decoupling buffer, an outlet clock decoupling buffer, and a flow control module. The UTOPIA inlet and outlet buffers are used for traffic management and the clock decoupling buffers allow the UTOPIA interface emulator and the link controller to operate in different clock domains. The link controller provides error control and backpressure delivery to support flow control.

10 Claims, 7 Drawing Sheets

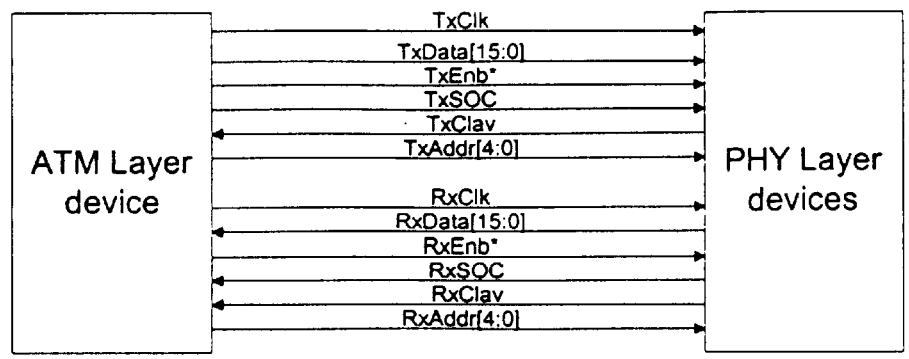
FIGURE 1. An Example of UTOPIA interface
PRIOR ART
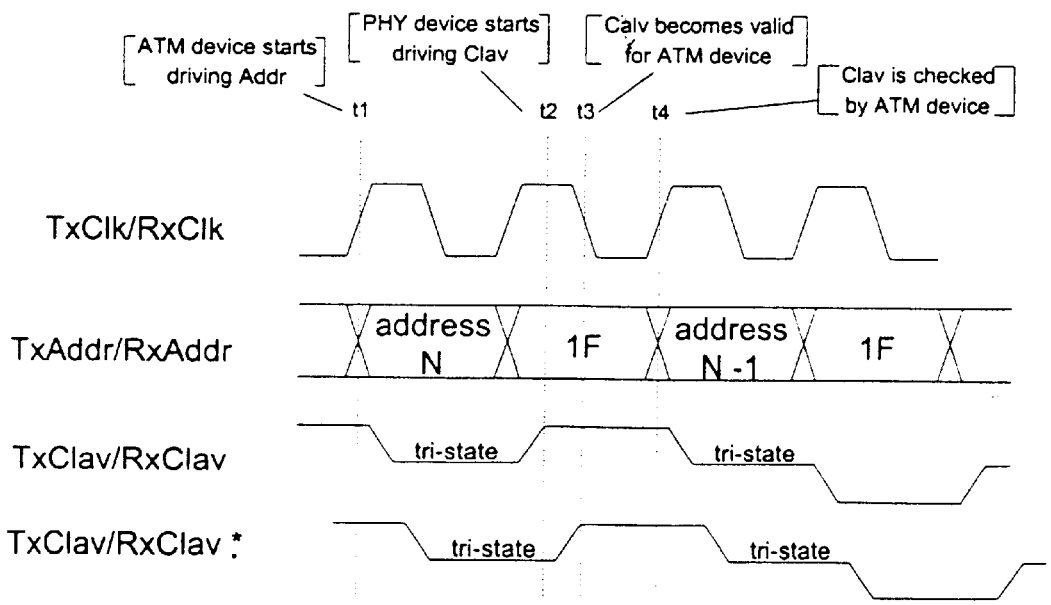
Note: TxClav/RxClav * are the Clav signals after transmission delay from PHY device to ATM device
FIGURE 2. UTOPIA level 2 address polling timing diagram
PRIOR ART POS-PHY: An Example of UTOPIA packet interface Note: PTPA/PRPA * are the Clav signals after transmission delay from PHY device to LINK device UTOPIA packet interface: POS-PHY level 2 address polling timing diagram

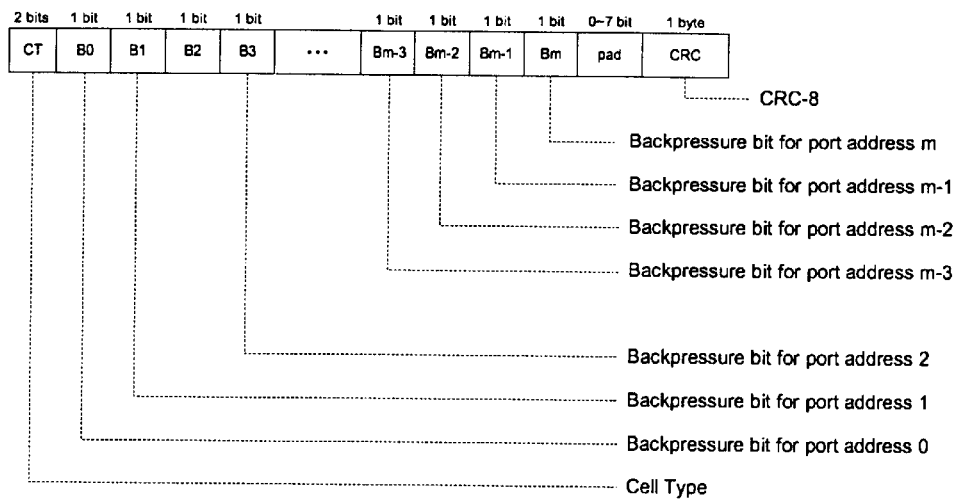
FIGURE 11. Idle link cell format

METHODS AND APPARATUS FOR EXTENDING THE TRANSMISSION RANGE OF UTOPIA INTERFACES AND UTOPIA PACKET INTERFACES

BACKGROUND OF THE INVENTION

1. Field of the Invention

The present invention relates to telecommunications. More particularly, the present invention relates to the passing of high speed Asynchronous Transfer Mode (ATM) data or packet data over a standardized Universal Test and Operations Physical Interface for ATM (UTOPIA) bus.

2. State of the Art

Perhaps the most awaited, and now fastest growing technology in the field of telecommunications in the 1990's is known as ATM technology. ATM is providing a mechanism for removing performance limitations of local area networks (LANs) and wide area networks (WANs) and providing data transfers at a speed of on the order of gigabits/second. Within the ATM technology, a commonly used interface specification between chips on a board for passing ATM cells is the UTOPIA (Universal Test & Operations PHY Interface for ATM) interface. The UTOPIA interface is specified in ATM Forum standard specifications, including: af-phy-0017.000 (UTOPIA Level 1, Version 2.01 Mar. 21, 1994); af_phy_0039.000 (UTOPIA Level 2, Version 1, June 1995); and af-phy-00136.000 (UTOPIA 3 Physical Layer Interface November 1999) which are hereby incorporated by reference herein in their entireties. A typical application of the UTOPIA interface is supporting the connection between an ATM network processor and various PHY devices such as a DSL chip set and/or a SONET framer. UTOPIA is also used as the interface between a switch fabric and an ATM network processor.

UTOPIA supports three operation modes: single PHY operation mode, Multiple PHY (MPHY) with Direct Status Indication operation mode and MPHY with Multiplexed Status Polling operation mode. In the single PHY mode, the UTOPIA interface includes a data bus and a control bus. The operation of UTOPIA in the single PHY mode is relatively simple and straightforward. In MPHY operation mode, the UTOPIA interface includes a data bus, a control bus and an address bus. MPHY with Multiplexed Status Polling is used in most applications.

The MPHY UTOPIA transmit interface includes the following signals: transmit data (TxData), transmit address (TxAddr) and transmit control signals transmit cell available (TxClav), transmit enable (TxEnb*) and transmit start of cell (TxSOC). The receive interface includes the following signals: receive data (RxData), receive address (RxAddr) and receive control signals receive cell available (RxClav), receive enable (RxEnb*) and receive start of cell (RxSOC). A MPHY device may consist of multiple PHY ports, each PHY port having a one-to-one correspondence with a PHY Port address that is related to a UTOPIA address and Clav (Cell buffer available) signal.

Prior art FIG. 1 illustrates an example of a UTOPIA Level 2 interface supporting MPHY with Multiplexed Status Polling operation. As shown in FIG. 1, a transmit clock signal (TxClk) is used to clock control signals and data signals in the transmit direction (from the ATM device to the PHY devices). The TxData[15:0] signal is a 16-bit UTOPIA transmit data bus. The assertion of TxEnb* is coincident with the start of the cell transfer. TxSOC is used to indicate the start of cell position. TxClav is used to indicate that the PHY layer device is ready to receive a cell from the ATM layer device. TxAddr[4:0] is the UTOPIA address and is used to poll and select the appropriate MPHY device.

At the UTOPIA transmit interface, the ATM layer device polls the TxClav status of a PHY layer device by placing a specified address on the TxAddr bus for one clock cycle. The PHY layer device which is associated with the address on the TxAddr bus drives TxClav high (or low) during the next clock cycle during which the ATM device places a null address (1F) on the TxAddr bus. The ATM layer device checks TxClav at a certain time after it issues TxAddr. Based on polled TxClav information, the ATM layer device can select a PHY device and transfer data to this PHY device by driving TxEnb* and TxSOC signals.

Similarly, RxClk is the receive clock signal that is used to clock control signals and data in the receive direction (from the PHY device to the ATM device). RxData[15:0] is a 16-bit UTOPIA Receive bus. The assertion of RxEnb* is coincident with the start of the cell transfer. RxSOC is used to indicate the start of cell position. RxClav is used to indicate that the PHY layer device is ready to Receive a cell from the ATM layer device. RxAddr[4:0] is the UTOPIA address of the PHY device and is used by the ATM device to poll and select the appropriate PHY device in the receive direction.

At the UTOPIA receive interface, the ATM layer device polls the RxClav status of a PHY layer device by placing a specified address on RxAddr bus for one clock cycle. The PHY layer device which is associated with the address on the RxAddr bus drives RxClav high (or low) during the next clock cycle during which the ATM device places a null address (1F) on the RxAddr bus. The ATM layer device checks RxClav at a certain time after it issues RxAddr. Based on polled RxClav information, the ATM layer device can select a PHY device and receive data from this PHY device by driving the RxEnb* signal.

Certain timing requirements must be met for the Multiplexed Status Polling operation of the UTOPIA interface so that the ATM layer device can correctly detect Clav (Cell buffer available) information. FIG. 2 depicts the timing requirement for UTOPIA level 2 address polling. An ATM device starts driving UTOPIA address N at time t1. The PHY device having address N responds to address polling by driving the Clav signal high (or low) at time t2. The Clav becomes valid for the ATM device at time t3 (after transmission delay) as illustrated by the last line of the timing diagram. The ATM device checks the Clav signal at time t4 in order to accommodate a certain amount of transmission delay. To guarantee correct operation, the Clav signal must be valid before it is checked by ATM device, i.e. at some t3<t4. This is a necessary timing requirement for the UTOPIA interface.

This timing requirement of the UTOPIA interface is not difficult to meet if the ATM device and the PHY device are on the same circuit board. However, if the devices are even just a few feet apart, the timing requirement will not be met because the Clav signal will not arrive at the ATM device until some time after t4 and thus will not be recognized.

PCT International Publication Number WO 00/22784 describes a modified UTOPIA interface for inter-board applications where the address timing generated by a polling master is extended to be two clock cycles long with no NULL address being driven onto the address line in between addresses. Output and input circuitry is provided in conjunction with the polling master and user ATM boards to accommodate hot insertion and to help drive the circuit. The master preferably includes an outgoing address latch and address latch control associated with the address bus and a register associated with the enable signal. The master also includes a hot insertion buffer on the incoming cell available (Clav) signal. The user device(s) include hot insertion buffers on the address bus, the data bus, and the enable signal. A remapping function is also preferably provided in associated with the user board which permits the user board to map received addresses into desired addresses. With the extended address timing and the provided circuitry, a workable inter-board hot insertable UTOPIA interface is established.

Although the modified UTOPIA interface enables the creation of a proprietary backplane application, it is no longer a standard UTOPIA interface and cannot directly interface with standard devices having a standard UTOPIA interface.

The standard UTOPIA interface is used to support ATM cell transmission. In industry, the UTOPIA interface is also used to support packet transmission by adding some control signals such as SOP(Start Of Packet) and EOP(End Of Packet), etc. UTOPIA 2P developed by TranSwitch Corporation and POS-PHY developed by PMC-Sierra Inc. are two typical UTOPIA packet interfaces that have been popularly used in packet switching.

In the transmit direction, the UTOPIA packet interface defines an "Available Signal" which is similar to TxClav in the standard UTOPIA interface to indicate whether the PHY layer device has a certain buffer space called a Chunk (chunk size can be 16, 48, 64 bytes etc.) available to receive data. The UTOPIA packet interface also provides a control handshaking to halt data transfer once the buffer in the selected PHY device is full or almost full, even if a packet has not been completely transmitted.

In the receive direction, the UTOPIA packet interface defines an "Available Signal" which similar to RxClav in the standard UTOPIA interface to indicate whether the PHY layer device has a certain length data (a Chunk whose size can be 16, 48, 64 bytes etc.) ready to transmit. The UTOPIA packet interface provides a control handshaking to indicate that the data and related control signals are valid or not to guarantee the integrity of a packet.

Prior art FIG. 3 illustrates the POS-PHY UTOPIA packet interface supporting Multiple PHY(MPHY) with Multiplexed Status Polling operation. As shown in FIG. 3, in the transmit direction, TFCLK is the same as TxClk and is used to clock transmit control signals and data. TDAT[15:0] is a 16-bit Transmit Data Bus which is the same as TxData. TENB is Transmit Enable and is the same as TxEnb. PTPA is the same as TxClav and is used to indicate that the PHY layer device is ready to receive a certain size data (a Chunk) from the LINK layer device. TADR[4:0] is the same as TxAddr and is the UTOPIA address used to poll and select the appropriate PHY device. The definition of the signals TFCLK, TDAT, TENB, PTPA and TADR follows the UTOPIA standard. In addition, POS-PHY adds some new signals to support packet transmission. These signals are: TSOP indicating Start Of Packet, TEOP indicating End Of Packet, TERR indicating packet transmit error, and STPA monitoring the buffer status of the selected PHY and allowing the LINK layer device to stop transmit data once the buffer in selected PHY device is full.

To transmit a packet, the LINK layer device polls the PTPA(TxClav) status of a PHY layer device by placing a specified address on the TADR(TxAddr) bus for one clock cycle. The PHY layer device associated with the address on the TADR bus drives PTPA high (or low) during the following cycle during which the LINK layer device places a null address on the address bus. The LINK layer device checks PTPA at a certain time after it issues TADR. Based on polled PTPA information, the LINK layer device selects a PHY device and transfers data to this PHY device by driving TENB. The LINK layer device always monitors the STPA signal and stops data transmission once STPA is deasserted. The LINK layer device drives TSOP to indicate the Start of Packet and drives TEOP to indicate End of Packet. The LINK layer device also drives TERR to indicate if transmitted packet is correct or not.

Similarly, in the receive direction, RFCLK is the receive Clock used to clock receive control signals and data. RDAT[15:0] is the 16-bit Receive Data Bus. RENB is the Receive Enable signal. PRPA indicates that a certain length data (a chunk) is available to be transmitted. RADR[4:0] is the UTOPIA address used to poll and select the appropriate MPHY device. The definition of the signals RFCLK, RDAT, RENB, PRPA and RADR follows the UTOPIA standard. In addition, POS-PHY adds some new signals to support packet transmission. These signals are: RSOP indicating Start Of Packet, REOP indicating End Of Packet, RERR indicating packet receive error and RVAL indicating the validity of data and control signals on the data bus and the control bus.

To receive a packet, the LINK layer device polls the PRPA(RxClav) status of a PHY layer device by placing a specified address on the RADR(RxAddr) bus for one clock cycle. The PHY layer device associated with the address on the RADR bus drives PRPA high (or low) during the next clock cycle while the LINK layer device puts the null address on the address bus. The LINK layer device checks PRPA at a certain time after it issues RADR. Based on polled PRPA information, the LINK layer device selects a PHY device and receives data from this PHY device by driving RENB. The LINK layer device always monitors the RVAL signal to determine if the received data is valid.

The same timing requirement must be met for the Multiplexed Status Polling operation of the UTOPIA packet interface as for the standard ATM UTOPIA interface. Prior art FIG. 4 depicts the timing requirement for POS-PHY level 2 address polling. The LINK layer device starts driving UTOPIA address N at time t1. The PHY device responds to address polling by driving Clav signal (PTPA/PRPA) high (or low) at time t2. Clav (PTPA/PRPA) becomes valid for the LINK layer device at time t3. The LINK layer device checks the Clav signal at time t4. To guarantee correct operation, the Clav signal must be valid before it is checked by the LINK layer device, i.e. at some time t3<t4.

Thus, the UTOPIA packet interface illustrates the same shortcomings as the UTOPIA ATM interface with regard to the allowable distance between the PHY device and the LINK layer device.

SUMMARY OF THE INVENTION

It is therefore an object of the invention to provide methods and apparatus for extending the transmission range of UTOPIA ATM and UTOPIA packet interfaces.

It is also an object of the invention to provide methods and apparatus for extending the transmission range of UTOPIA interfaces which maintain compatibility with the existing standards.

It is also an object of the invention to provide methods and apparatus for extending the transmission range of UTOPIA interfaces which enable communication via a "transmission cloud".

In accord with these objects which will be discussed in detail below, the methods and apparatus of the present invention for extending the transmission range of a UTOPIA ATM interface include providing two UTOPIA extension devices, one for coupling a PHY layer device to a transmission cloud and one for coupling an ATM layer device to the transmission cloud. Each device includes a UTOPIA interface emulator, a link controller, and a media transceiver. The media transceiver can be made to support various media such as a backplane, copper cable, optical fiber, or a wireless medium. According to the presently preferred embodiment, the UTOPIA extension device includes a UTOPIA inlet buffer, a UTOPIA outlet buffer, an inlet clock decoupling buffer, an outlet clock decoupling buffer, and a flow control module. The UTOPIA inlet and outlet buffers are used for traffic management and the clock decoupling buffers allow the UTOPIA interface emulator and the link controller to operate in different clock domains. The link controller provides error control and backpressure delivery to support flow control. Flow control is realized by controlling related UTOPIA control signals based on backpressure information. A link control protocol is provided to guarantee reliable information transfer through the transmission cloud. The link control protocol provides data transmission error control, backpressure information delivery, PHY Port address transfer (including UTOPIA address and related Clav information), UTOPIA address polling information transfer and link maintenance. The link control protocol is implemented by defining three kinds of link cell: a data link cell, a control link cell and an idle link cell. The data link cell contains a payload, error checks, addressing, and Clav indication. The control link cell has two formats: backpressure control link and RxAddr bitmap control link. The backpressure control link cell includes a plurality of backpressure cells, one for each buffer. Each backpressure cell includes a backpressure indicator, Clav and UTOPIA address. The RxAddr bitmap control link cell includes a UTOPIA address group ID and a UTOPIA address group bitmap. The idle link cell is transmitted for link maintenance when there is no traffic.

The UTOPIA extension which is coupled to an ATM layer device acts as a slave (S) and the UTOPIA extension which is coupled to a PHY layer device acts as a master (M). In operation, the ATM layer device polls a TxClav status of the UTOPIA extension device (S) by placing its UTOPIA address on the TxAddr bus. The UTOPIA extension device (S) drives TxClav after checking the address on the TxAddr bus, the status of the UTOPIA inlet buffer (i.e. if it is ready to receive an ATM cell), and backpressure information. When all TxEnb* signals are deasserted, based on polled TxClav information, the ATM layer device selects a PHY port for data cell transfer by placing the desired UTOPIA address onto the TxAddr bus and asserting the desired TxEnb* signal. The UTOPIA extension device (S) receives the cell on the data bus by examining the UTOPIA address on the TxAddr bus and the asserted TxEnb* signal. When the UTOPIA extension device (S) receives an ATM cell from the ATM layer device, it creates a data link cell based on the received ATM cell and related PHY Port address. The data link cell is transmitted to the UTOPIA extension device (M) across the transmission cloud.

When the UTOPIA extension device (M) receives a correct data link cell, it saves the ATM cell contained in the payload of the data link cell and the PHY Port address retrieved from the header of data link cell into a related queue in the UTOPIA outlet buffer. The UTOPIA extension device (M) emulates the ATM layer device to poll and select the PHY port and transmit the ATM cell in the UTOPIA outlet buffer to the selected PHY device. A backpressure flow control is used to avoid UTOPIA outlet buffer overflow. More particularly, the UTOPIA extension device (M) emulates the ATM layer device and polls a TxClav status of a PHY layer device by placing its UTOPIA address on the RxAddr bus. The PHY device drives RxClav based on the address on the RxAddr bus. The UTOPIA extension device (M) may keep polling PHY ports constantly or poll them at certain times. When all the RxEnb* signals are deasserted, based on polled RxClav information, the UTOPIA extension device (M) selects a PHY port for data cell transfer by placing the desired UTOPIA address onto the RxAddr bus and asserting the desired RxEnb* signal. The PHY device transmits a cell onto the data bus by examining the UTOPIA address on RxAddr bus and the asserted RxEnb* signal. When the UTOPIA extension device (M) receives an ATM cell from a PHY layer device, it creates a data link cell based on the received ATM cell and related PHY Port address. The data link cell is transmitted to the UTOPIA extension device (S) across the transmission cloud.

When the UTOPIA Extension device (S) receives a correct data link cell, it saves the ATM cell contained in the payload of the data link cell and the PHY Port address retrieved from the header of data link cell into related queue in the UTOPIA outlet buffer. The UTOPIA extension device (S) emulates a PHY device and drives RxClav after checking the UTOPIA address on the RxAddr and the status of each queue in the UTOPIA outlet buffer. For example, if there is an ATM cell in a queue of UTOPIA outlet buffer, when the related UTOPIA address is placed on the RxAddr bus, the UTOPIA extension device (S) drives the related RxClav. A backpressure flow control is used to avoid UTOPIA outlet buffer overflow.

When traffic flow is in the TX direction, the UTOPIA extension device (M) detects the status of every queue in the UTOPIA outlet buffer. When a queue reaches a certain depth, a backpressure control link cell is generated to carry backpressure information related to the PHY Port address in this queue. The backpressure control link cell is sent to the UTOPIA extension device (S) across the transmission cloud in the RX direction. The UTOPIA extension device (S) stops receiving more cells which are related to the PHY Port address specified with backpressure information carried in the backpressure control link cell by deasserting the related TxClav for the specified UTOPIA address.

When traffic flow is in the RX direction, the UTOPIA extension device (S) detects the status of every queue in the UTOPIA outlet buffer. Once a queue reaches a certain depth, a backpressure control link cell is generated to carry backpressure information related to the PHY Port address in this queue. The backpressure control link cell is sent to the UTOPIA extension device (M) across the transmission cloud in the TX direction. The UTOPIA extension device (M) stops receiving more cells which are related to the PHY Port address specified with backpressure information carried in the backpressure control link cell by deasserting the related RxEnb* for the specified UTOPIA address.

The methods and apparatus of the present invention for extending the transmission range of a UTOPIA packet interface are similar to those described above except for taking into account packet specific information in the data link cell and implementing a slightly different buffer structure.

Additional objects and advantages of the invention will become apparent to those skilled in the art upon reference to the detailed description taken in conjunction with the provided figures.

BRIEF DESCRIPTION OF THE DRAWINGS

FIG. 1 is an illustration of a prior art UTOPIA ATM interface;

FIG. 2 is a simplified prior art timing diagram illustrating the polling of PHY layer devices by an ATM layer device;

FIG. 11 is a diagram illustrating the format of an idle link cell according to the invention.

DETAILED DESCRIPTION OF THE PREFERRED EMBODIMENTS

Figure 3:
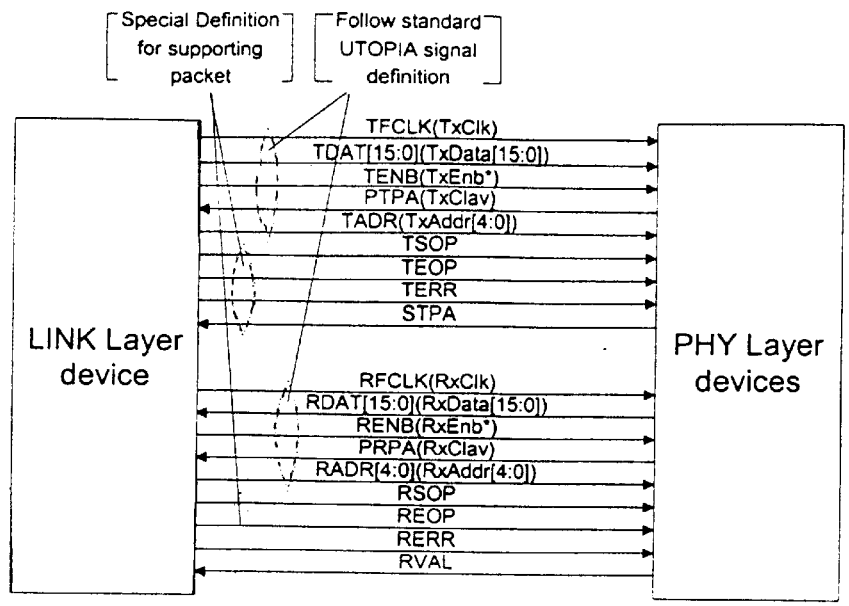
FIG. 3 is an illustration of a prior art UTOPIA packet interface.
Figure 4:
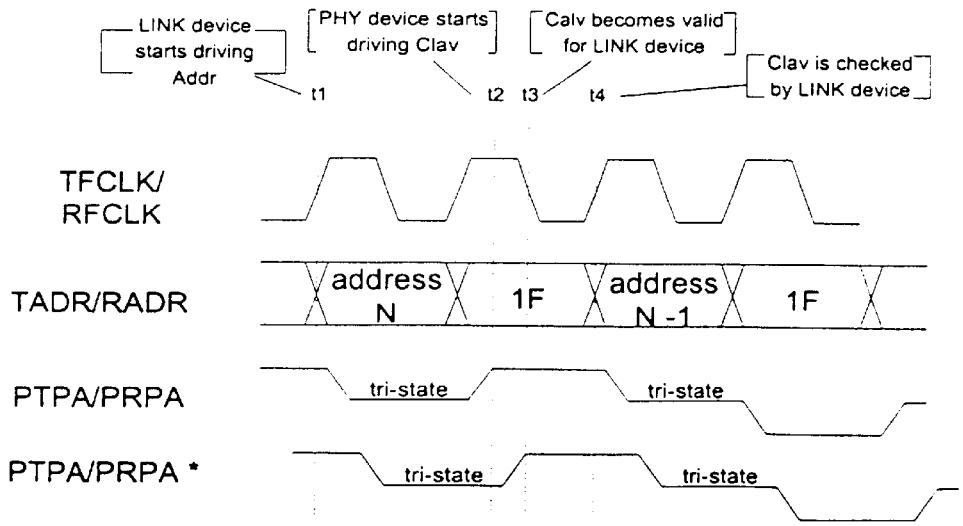
FIG. 4 is a simplified prior art timing diagram illustrating the polling of PHY layer devices by a LINK layer device.
Figure 5:
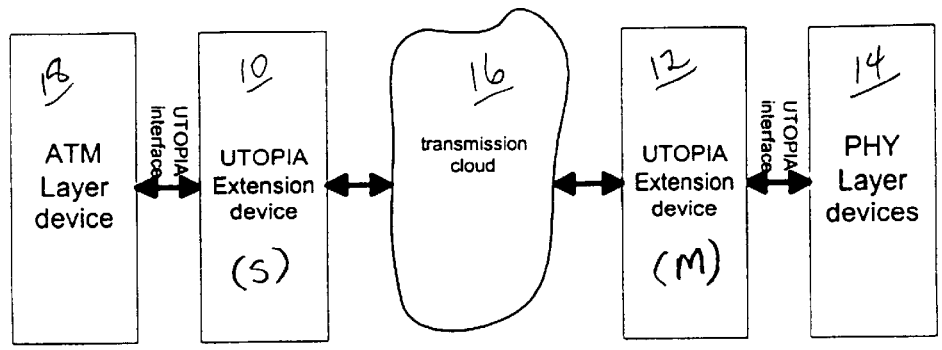
FIG. 5 is a simplified block diagram illustrating how the transmission range of a UTOPIA ATM interface is extended according to the invention.

Referring now to FIG. 5, the methods and apparatus of the present invention for extending the transmission range of a UTOPIA ATM interface include providing two UTOPIA extension devices 10, 12. Extension device 10 is for coupling an ATM layer device 18 to the transmission cloud 16 and it talks to ATM layer device 18 by emulating a PHY layer UTOPIA interface. The UTOPIA extension device 12 is for coupling one or more PHY layer devices 14 to a transmission cloud 16 and talks to a PHY layer device by emulating an ATM layer UTOPIA interface. The latency caused by the transmission cloud is resolved between the UTOPIA extension devices. Therefore, the ATM layer device 18 and the PHY layer device 14 can be connected via these UTOPIA extension devices across the transmission cloud 16. Through the invention, where the UTOPIA interface is extended transparently by the UTOPIA extension devices, it appears that the ATM layer device 18 is directly connected to the remote PHY devices 14 and. As will be explained in more detail below with reference to FIGS. 7–10, the operation of the UTOPIA extension device 10 will be somewhat different from the operation of the UTOPIA extension device 12. Nevertheless, it will be understood that the two devices can be realized with the same hardware, but with slightly different programming.

Figure 6:
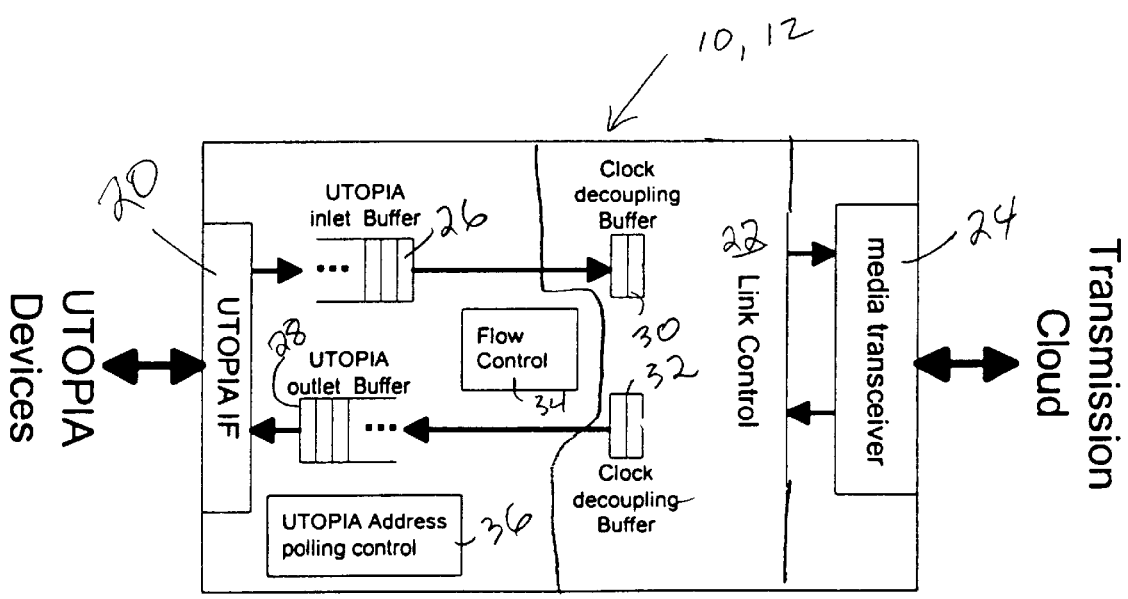
FIG. 6 is a simplified block diagram of a UTOPIA extension device according to the invention.
Figure 8:
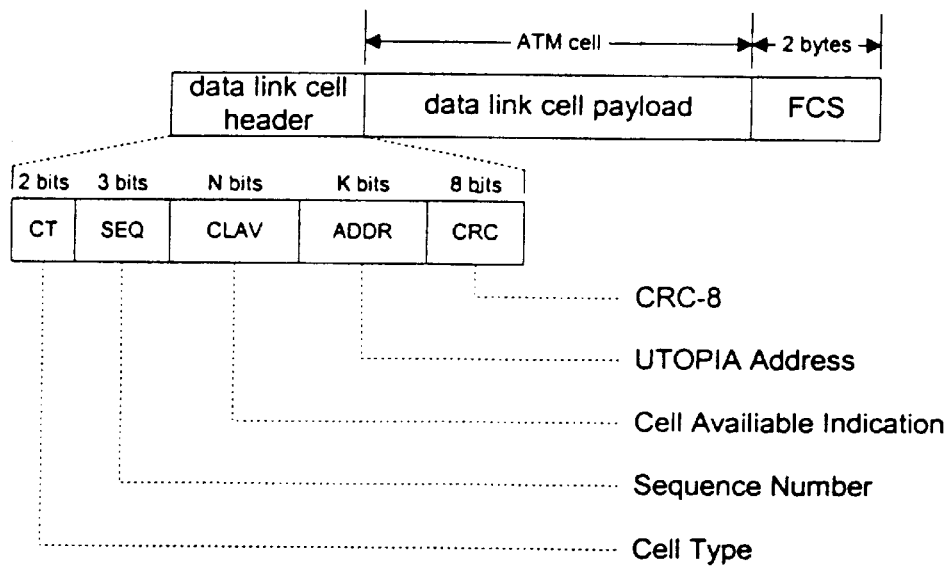
FIG. 8 is a diagram of the format of a data link cell according to the invention.
Figure 9:
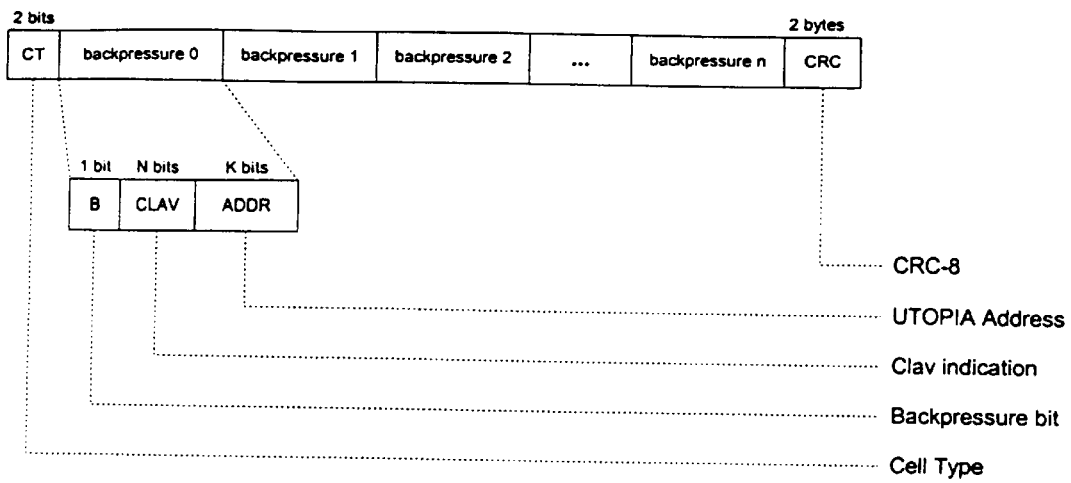
FIG. 9 is a diagram illustrating the format of a backpressure control link cell according to the invention.
Figure 10:
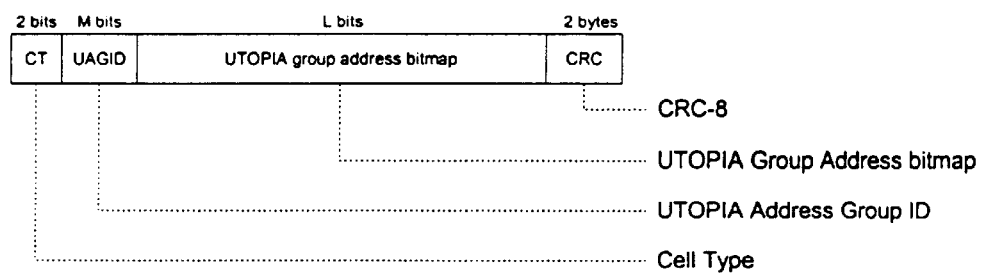
FIG. 10 is a diagram illustrating the format of a RxAddr bitmap control link cell according to the invention.

Referring now to FIG. 6, each device 10, 12 includes a UTOPIA interface emulator 20, a link controller 22, and a media transceiver 24. The media transceiver 24 can be made to support various media such as a backplane, copper cable, optical fiber, or a wireless medium. According to the presently preferred embodiment, the UTOPIA extension device includes an optional UTOPIA inlet buffer 26, a UTOPIA outlet buffer 28, an inlet clock decoupling buffer 30, an outlet clock decoupling buffer 32, a flow control module 34, and a UTOPIA address polling control module 36. The UTOPIA inlet and outlet buffers 26, 28 are used for traffic management and the clock decoupling buffers 30, 32 allow the UTOPIA interface emulator and the link controller to operate in different clock domains. The flow control module 34 receives and generates backpressure indications as described in more detail below. The link controller 22 manages the flow of data, provides error control and backpressure information into and out of the device. Flow control is realized by controlling related UTOPIA control signals based on backpressure information. A link control protocol is provided to guarantee reliable information transfer through the transmission cloud. The link control protocol, which is described in more detail below with reference to FIGS. 8–10, provides data transmission error control, backpressure information delivery, PHY Port address transfer (including UTOPIA address and related Clav information), UTOPIA address polling information transfer and link maintenance.

Figure 7:
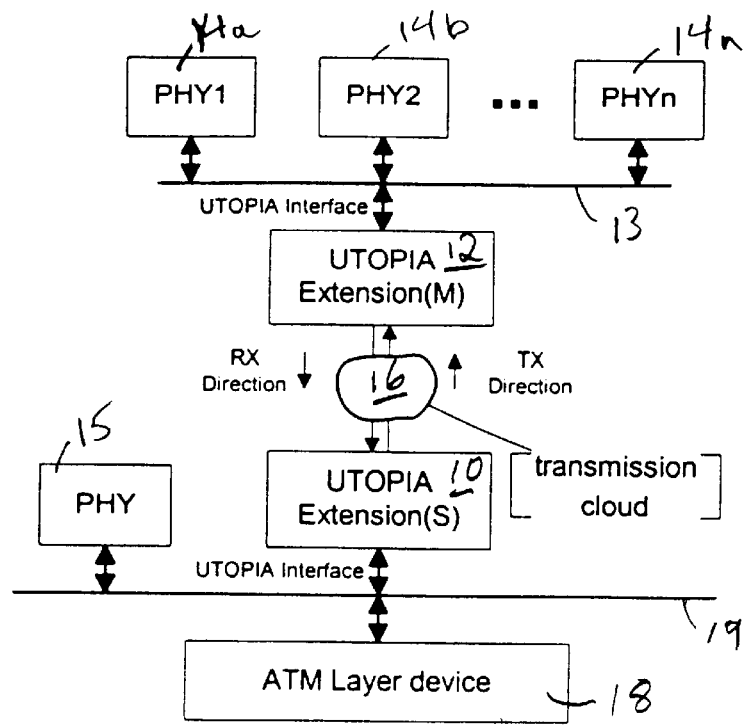
FIG. 7 is a simplified block diagram illustrating a local UTOPIA interface bus and a remote UTOPIA interface bus linked via a transmission cloud by the UTOPIA extension devices of the invention.

FIG. 7 shows a typical connection for the UTOPIA extension devices 10, 12 of the invention. As mentioned above, the extension devices of the invention are designed to operate within the UTOPIA ATM standard. Thus, the UTOPIA interfaces 19 and 13 are standard and neither the ATM layer device 18 nor any of the physical devices 14a, 14b, . . . 14n, 15 are modified in any way.

As with a normal UTOPIA interface, the ATM layer device 18 performs the function of master and each PHY layer device 14a, 14b, . . . 14n, 15 performs the function of slave. The UTOPIA extension device 10, which is connected to the ATM layer device, emulates a (slave) PHY layer device and is referred to herein as the UTOPIA extension device (S). The UTOPIA extension device 12, which is connected to the remote PHY layer devices 14a, 14b, . . . 14n, emulates an ATM (master) layer device and is referred to herein as UTOPIA extension device (M). The transmission direction TX shown in FIG. 7 from the UTOPIA extension device (S) to the UTOPIA extension device (M) is compliant with the standard UTOPIA interface transmit direction (from the ATM layer to the PHY layer). The RX direction from the UTOPIA extension (M) to the UTOPIA extension (S) is also compliant with the standard UTOPIA interface receive direction (from the PHY layer to the ATM layer).

As mentioned above, a UTOPIA packet extension device according to the invention is substantially the same as the UTOPIA ATM extension device described above. However, rather than having a UTOPIA interface emulator (20 in FIG. 6), the devices have a. UTOPIA packet interface emulator (not shown). Moreover, rather than interfacing with an ATM layer device (18 in FIG. 5), the UTOPIA packet extension device (S) will interface with a link layer device (not shown).

The Link Control Protocol

As mentioned above, a link control protocol is defined to guarantee reliable information transfer through the transmission cloud. The link control protocol is preferably implemented by defining three kinds of link cells: a data link cell, a control link cell and an idle link cell.

Referring now to FIG. 8, the data link cell for use with a UTOPIA ATM extension device includes a data link cell header, a data link cell payload and a frame check sequence (FCS). The data link cell header includes cell type, sequence number, Clav indication, UTOPIA address and header CRC.

The cell type is a 2-bit field and is used to distinguish the data link cell from other kinds of link cells. The sequence number is a 3-bit field and is used for cell drop detection. When a received data link cell has a wrong sequence number, cell drop occurs. Clav indication indicates a UTOPIA Clav signal with which the ATM cell in data link cell payload is associated. The size of this field is dependent upon how many Clav signals are implemented. For example, if the UTOPIA Extension device is implemented to support four Clav signals, the Clav indication field is two bits in length. The UTOPIA address field carries the UTOPIA address that is latched at the UTOPIA interface and corresponds to the ATM cell carried in the data link cell payload. The size of the UTOPIA address field is determined by the level of UTOPIA interface. UTOPIA level 2 has a 5-bit wide address, UTOPIA level 3 has an n-bit wide address and n can be any positive integer. The CRC-8 field is a one byte CRC that covers the entire data link cell header. The data link cell payload carries one 53-byte ATM cell. The FCS is a 2-byte field that contains the CRC (Cyclic Redundancy Check) for the entire data link cell payload error check.

Figure 8A:
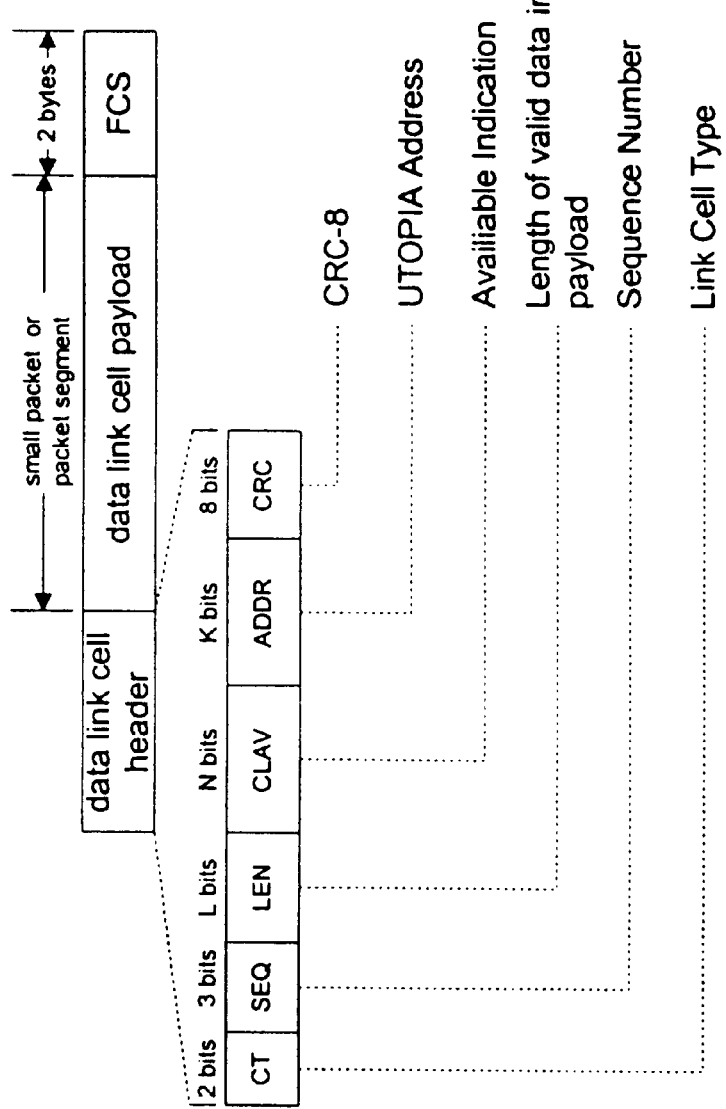
FIG. 8a is a diagram of the format of a data link cell for use with a UTOPIA packet interface extension according to the invention.

FIG. 8a shows a data link cell for use with a UTOPIA packet interface. The cell structure is virtually identical but for the size of the payload and the inclusion of a payload length field in the cell header. It will be appreciated that, unlike ATM cells, packets can vary in length. The data link cell shown in FIG. 8a is designed to accommodate small packets or packet segments.

The control link cell is actually two types of cells: the backpressure control link cell shown in FIG. 9 and the RxAddr (UTOPIA Receive Address) bitmap control link cell shown in FIG. 10. The backpressure control link cell carries backpressure information to support traffic flow control. The RxAddr bitmap control link cell carries the UTOPIA receive address polling information. The UTOPIA extension device (M) executes RxAddr polling based on the information in the RxAddr bitmap.

Referring now to FIG. 9, the backpressure control link cell includes a two bit Cell Type and several groups of backpressure information, backpressure 0 through backpressure n, and an eight bit CRC-8. Each backpressure group includes a backpressure bit, a Clav indication and a UTOPIA address. When the backpressure bit=1, it indicates that backpressure is present (set). When the backpressure bit=0, it indicates that backpressure has been released.

The number of backpressure groups which a backpressure control link cell should include is based on the relationship between the bandwidth of the UTOPIA interfaces and the bandwidth of media transceivers. For example, if the media transceivers and the UTOPIA interface emulator in a UTOPIA extension device have equivalent bandwidth, the backpressure control link cell should include four backpressure groups. This is because once a backpressure control link cell is generated, it may not be sent to the transmission cloud immediately if a data link cell is being transmitted in the same direction. Because of this transmit delay, there is a probability that a maximum of four queues in the UTOPIA outlet buffer changes their backpressure status (either backpressure set or backpressure released).

As shown in FIG. 10, the RxAddr bitmap control link cell includes a two bit Cell Type, a UTOPIA address group, a UTOPIA group address bitmap and an eight bit CRC-8. The UTOPIA RxAddr bitmap is divided into several groups, and the size of each group is dependent on the size of the backpressure control link cell so that all control link cells have the same size. Each group is assigned a UTOPIA address group ID. Each bit in the UTOPIA group address bitmap is associated with an RxAddr. If a bit is equal to 1, the related RxAddr is active in polling. Otherwise, the RxAddr is inactive.

The control link cells used in a UTOPIA packet interface extension according to the invention are the same as those described above.

As mentioned above, an idle link cell is used for transmission maintenance. When there is no traffic, the UTOPIA extension device transmits the idle link cell across the transmission cloud at a millisecond time interval to indicate link status. There is a timer (not shown) in the media transceiver receive side of a UTOPIA extension device. The timer is cleared if a data link cell (or control link cell or idle link cell) is received correctly before the timer times out. If the timer times out before a cell is received, it is taken to mean that the link is down. The idle link cell and control link cell have the same cell size. All bits in the idle link cell are zero except for a two-bit cell type and two-bit CRC field that have the same size and position as those in the control link cell.

According to the presently preferred embodiment, the idle cell includes the backpressure bitmap so that down links which had backpressure set can have backpressure released. More particularly, as shown in FIG. 11, the idle link cell includes a two bit cell type indicator, a plurality of one bit back pressure flags, and an eight bit CRC-8. Preferably, the idle link cell is a multiple of eight bits long. Therefore, depending on the number of ports "m", a padding field of 0–7 bits is added just before the CRC-8 field. The reason for carrying the backpressure bitmap in the idle link cell is to prevent a port from being permanently disabled because of backpressure control link cell loss. For example, if a queue in the outlet buffer of UTOPIA extension (M) experiences congestion, a backpressure control link cell is generated and transferred to UTOPIA extension (S) to stop transmitting related traffic. After the congestion disappears in the same queue, UTOPIA extension (M) will generate a backpressure control link cell and this backpressure control cell is transferred to UTOPIA extension (S) across the transmission cloud to release the related backpressure flow control so that related traffic transmission can restart. If the backpressure control link cell in which backpressure release information is carried is dropped, transmission of related traffic will never be restarted. Since the idle link cell carries all backpressure information for each port address, it can be used to update the backpressure control bitmap in UTOPIA extension (S) to recover any port that has been permanently disabled.

The idle link cell used in a UTOPIA packet interface extension according to the invention is the same as that described above.

The Buffer Structure

As mentioned above, the buffer structures for the UTOPIA ATM extension and those for the UTOPIA packet interface extension are different. In both cases the UTOPIA outlet buffer includes a number of queues, each queue being associated with a PHY Port address. The size of the UTOPIA outlet buffer is based on the number of PHY ports that the extension device is configured to support. Each queue in the UTOPIA outlet buffer includes a data FIFO and a control FIFO.

In the extension device (S), when coupled to an ATM layer device, the data FIFO is used to save ATM cells and the control FIFO is used to save PHY Port address information so that every ATM cell is corresponding to a specified PHY Port address.

In the extension device (S), when coupled to a LINK layer device the data FIFO is used to carry packet data and the control FIFO is used to carry control information for each word in the data FIFO in addition to the PHY Port address information. In particular, the control FIFO includes: an indication whether the associated word in the data FIFO is MOP (Middle Of Packet), SOP (Start Of Packet), EOP (End of packet), or SP (Single packet); the number of valid byte(s) in the associated word in the data FIFO when a word consists of multiple bytes; and whether the associated word in the data FIFO is an error word.

The UTOPIA inlet buffer has the same structure as UTOPIA outlet buffer. It is used for traffic management when the data transmission bandwidth of the media transceiver is smaller than the bandwidth of the UTOPIA ATM interface (or much smaller than the bandwidth of the UTOPIA packet interface and where packet data transmission cannot be halted immediately once a PHY layer device buffer is full). The UTOPIA interface extension devices of the invention can be implemented without a UTOPIA inlet buffer if the data transmission bandwidth of the media transceiver is equal to or larger than the bandwidth of the UTOPIA ATM interface (or similar to or larger than the bandwidth of the UTOPIA packet interface).

If data transmission bandwidth of media transceiver is only a little bit smaller than the bandwidth of the UTOPIA ATM interface, the UTOPIA extension device can also be implemented without a UTOPIA inlet buffer. In this case, the clock decoupling buffer in the UTOPIA transmit direction can be used for traffic management. The clock decoupling buffer has the same structure as a queue in the UTOPIA outlet/UTOPIA inlet buffer and can be written and read simultaneously with different clocks.

Configuration and Status Reports

The UTOPIA ATM extension device can be configured to support various operation modes such as ATM layer emulation, PHY layer emulation, single PHY, MPHY, UTOPIA address polling control, etc. The configuration can be controlled by a microprocessor interface, but a microprocessor interface increases the complexity and cost of the UTOPIA extension device. Configuration implementation can be simplified by means of a configuration ATM cell generated by system host processor. The configuration ATM cell is a special ATM cell such as an unassigned ATM cell in which all bits in the ATM header are zero, or a system specified ATM cell. The configuration ATM cell can be generated by a system host processor, and it carries configuration control information in its payload. The configuration ATM cell can be sent to the UTOPIA extension device from an ATM layer device or a PHY layer device through their UTOPIA interfaces.

Upon receipt of a configuration cell, the link control of the UTOPIA extension device send the configuration information to a configuration register (not shown) which, in turn, forwards the information to all elements of the device which need to be configured.

The UTOPIA packet extension device can be configured to support various operation modes such as LINK layer emulation, PHY layer emulation, single PHY, MPHY, UTOPIA address polling control, etc. The configuration can be controlled by a microprocessor interface, but a microprocessor interface increases the complexity and cost of the UTOPIA packet interface extension device. Configuration can be simplified by means of a configuration packet generated by system a host processor. The configuration packet is a system specified packet. The configuration packet can be generated by a system host processor, and it carries configuration control information in its payload. The configuration packet can be sent to UTOPIA packet interface extension device from a LINK layer device or a PHY layer device through their UTOPIA packet interfaces.

All operation status inside the UTOPIA ATM extension device can be reported by a status report ATM cell. The payload of the status report ATM cell carries all status information inside the UTOPIA ATM extension device. A control ATM cell, as described above can be used to specify an ATM header and PHY port address for the status report ATM cell.

The UTOPIA packet interface extension device can generate a report packet to report the status of the extension device. All operation status inside UTOPIA packet interface extension device can be reported by the status report packet. A control packet, as described above, can be used to specify a report packet header and PHY port address for the status report packet.

Basic Operation of the UTOPIA Extension Devices

The UTOPIA extension which is coupled to an ATM layer device acts as a slave (S) and the UTOPIA extension which is coupled to a PHY layer device acts as a master (M).

Data Flow from the ATM Layer Device to the PHY Layer Device

The ATM layer device 18 polls a TxClav status of UTOPIA extension (S) by placing its UTOPIA address on the TxAddr bus at the UTOPIA interface 20. The UTOPIA extension (S) drives TxClav by checking the address on the TxAddr bus, the status of the UTOPIA inlet buffer 26 (i.e. if it is ready to receive an ATM cell) and backpressure information. When all TxEnb* signals are deasserted, based on polled TxClav information, the ATM layer device selects a PHY port for data cell transfer by placing the desired UTOPIA address onto the TxAddr bus and asserting the desired TxEnb* signal. The UTOPIA extension (S) receives the cell on the data bus by examining the UTOPIA address on the TxAddr bus and the asserted TxEnb* signal. When the UTOPIA extension (S) receives an ATM cell from the ATM layer device, the UTOPIA interface 20 creates a data link cell based on the received ATM cell and related PHY Port address. If the cell is a valid cell, it is forwarded to the clock decoupling buffer and the data link cell is then transmitted to the UTOPIA extension (M) 12 across the transmission cloud.

When the UTOPIA extension (M) 12 receives a correct data link cell, it saves the ATM cell contained in the payload of data link cell and the PHY Port address retrieved from the header of data link cell into a related queue in the UTOPIA outlet buffer 28. The UTOPIA extension (M) emulates the ATM layer device by having the polling control 36 poll TxClav status, select the PHY port, and transmit the ATM cell in the UTOPIA outlet buffer to the selected PHY device. As described hereinafter, the flow control 34 monitors the depth of the queues in the outlet buffer 28. If any of the queues fills beyound a desired amount, a backpressure cell is generated by the flow control 34 and/or the link control 22. The backpressure cell is preferably given high priority by the link control 22 for transmission. In this manner, backpressure flow control is used to avoid UTOPIA outlet buffer overflow.

Data Flow from the PHY Layer Device to the ATM Layer Device

The UTOPIA extension (M) emulates the ATM layer device and polls a RxClav status of a PHY layer device by placing its UTOPIA address on the RxAddr bus. The PHY device drives RxClav based on the address on the RxAddr bus. The UTOPIA extension (M) may keep polling PHY ports constantly or poll them at certain times. When all RxEnb* signals are deasserted, based on polled RxClav information, the UTOPIA extension (M) selects a PHY port for data cell transfer by placing the desired UTOPIA address onto the RxAddr bus and asserting the desired RxEnb* signal. The PHY device transmits a cell onto the data bus by examining the UTOPIA address on the RxAddr bus and the asserted RxEnb* signal.

When the UTOPIA extension (M) receives an ATM cell from a PHY layer device, it creates a data link cell based on the received ATM cell and related PHY Port address. The data link cell is transmitted to the UTOPIA extension (S) across transmission cloud.

When the UTOPIA Extension (S) receives a correct data link cell, it saves the ATM cell contained in the payload of data link cell and the PHY Port address retrieved from the header of data link cell into related queue in the UTOPIA outlet buffer. The UTOPIA extension (S) emulates an MPHY device and drives RxClav by checking the UTOPIA address on the RxAddr bus and the status of each queue in the UTOPIA outlet buffer. For example, if there is an ATM cell in a queue of the UTOPIA outlet buffer, when the related UTOPIA address is placed on the RxAddr bus, the UTOPIA extension (S) drives the related RxClav. A backpressure flow control is used to avoid UTOPIA outlet buffer overflow.

Flow Control in the TX Direction

When traffic flow is from the ATM layer device to the PHY layer device (i.e., in the TX direction), the flow control of the UTOPIA extension (M) detects the status of every queue in the UTOPIA outlet buffer. When a queue reaches a certain depth, the flow control and/or the link control generates a backpressure control link cell which carries backpressure information related to the PHY Port address in this queue. The backpressure control link cell is sent to the UTOPIA extension (S) across the transmission cloud in the RX direction and is received by the flow control of the UTOPIA extension device (S).

In response to the backpressure control link cell, the flow control of the the UTOPIA extension (S) stops receiving more cells (from the ATM layer device) which are related to the PHY Port address specified with backpressure information carried in the backpressure control link cell. This is accomplished by deasserting the related TxClav for the specified UTOPIA address.

Flow Control in the RX Direction

When traffic flow is from the PHY layer device to the ATM layer device (i.e., in the RX direction), the flow control of the UTOPIA extension (S) detects the status of every queue in the UTOPIA outlet buffer. Once a queue reaches a certain depth, a backpressure control link cell is generated to carry backpressure information related to the PHY Port address in this queue. The backpressure control link cell is sent to the UTOPIA extension (M) across the transmission cloud in the TX direction.

In response to the backpressure control link cell, the UTOPIA extension (M) stops receiving more cells (from the PHY layer device) which are related to PHY Port address specified with backpressure information carried in the backpressure control link cell by deasserting the related RxEnb* for the specified UTOPIA address.

Data Flow from a LINK Layer Device to a PHY Device

The UTOPIA packet extension which is coupled to a LINK layer device acts as a slave (S) and the UTOPIA packet extension which is coupled to a PHY layer device acts as a master (M). In operation the LINK layer device polls a TxClav status of the UTOPIA packet extension (S) by placing its UTOPIA address on TxAddr bus. The UTOPIA packet extension (S) drives Tx Clav by checking the address on the TxAddr bus, the status of UTOPIA inlet buffer (i.e. if it is ready to receive a Chunk) and the backpressure information. When all TxEnb* signals are deasserted, based on polled TxClav information, the LINK layer device selects a PHY port for data packet transfer by placing the desired UTOPIA address onto the TxAddr bus and asserting desired TxEnb* signal. The UTOPIA packet extension (S) receives the packet data on the data bus by examining the UTOPIA address on the TxAddr bus and the asserted TxEnb* signal. The LINK layer device stops transmitting packet data once the buffer in the selected PHY device is full.

When the UTOPIA packet extension (S) receives packet data coming from the LINK layer device, it creates a data link cell based on one of following situations:

(1) Data transmission is continuously related to the same packet and received data reaches to a chunk deep;

(2) Data transmission is changed to correspond to a different packet;

(3) EOP is received; and (4) Receive two SOPs without an EOP in the middle (EOP lost). Data link cell creation is based on the information in the control FIFO of the clock decoupling buffer. The data link cell is transmitted to UTOPIA packet extension (M) across the transmission cloud.

When the UTOPIA packet extension (M) receives a correct data link cell, it stores the packet data in the payload of the data link cell to the data FIFO of the related queue, and control information retrieved from the header of the data link cell into the control FIFO of the same queue in the UTOPIA outlet buffer. The UTOPIA packet extension (M) emulates the LINK layer device to poll and select a PHY port and transmit packet data in the UTOPIA outlet buffer to the selected PHY device based on the information in the related control FIFO. A backpressure flow control is used to avoid UTOPIA outlet buffer overflow.

Data Flow from a PHY Device to the LINK Layer Device

In the RX direction, the UTOPIA packet extension (M) emulates a LINK layer device and polls the RxClav status of a PHY layer device by placing its UTOPIA address on the RxAddr bus. The PHY device drives RxClav based on the address on the RxAddr bus. The UTOPIA packet extension (M) may keep polling PHY ports constantly or poll them at certain times.

When all RxEnb* signals are deasserted, based on polled RxClav information, the UTOPIA packet extension device selects a PHY port for data cell transfer by placing the desired UTOPIA address onto the RxAddr bus and asserting the desired RxEnb* signal. The PHY device transmits packets onto the data bus by examining the UTOPIA address on the RxAddr bus and the asserted RxEnb* signal.

When the UTOPIA packet extension(M) receives packet data coming from the PHY layer device, it creates a data link cell based on one of following situations:

(1) Data transmission is continuously related to the same packet and received data reaches to a chunk deep;

(2) Data transmission is changed to correspond to different packet;

(3) EOP is received; and (4) Received two SOPs without an EOP in the middle (EOP lost).

Data link cell creation is based on the information in the control FIFO of the clock decoupling buffer. The data link cell is transmitted to the UTOPIA packet extension (S) across the transmission cloud.

When the UTOPIA packet extension (S) receives a correct data link cell, it stores the packet data in the payload of the data link cell to the data FIFO of the related queue, and control information retrieved from the header of the data link cell into the control FIFO of the same queue in the UTOPIA outlet buffer. A backpressure flow control is used to avoid UTOPIA outlet buffer overflow. The UTOPIA packet extension (S) emulates a PHY layer device to drive the RxClav based on the status of related queue in the outlet buffer and the UTOPIA address on the RxAddr bus. Once a queue in the outlet buffer is selected by the LINK layer device, the packet data in this queue will be transmitted to the LINK layer device once the RxEnb* is active.

Flow control between a LINK layer device and a PHY layer device is the same as described above with respect to the ATM layer device and the PHY layer device.

Address Polling Control

As suggested above, address polling for the UTOPIA extension (M) may be either static or dynamic. Since the UTOPIA extension (M) emulates the ATM layer device (or the LINK layer device), it needs to select UTOPIA addresses to join status polling. It is not efficient to enable the UTOPIA addresses which are not specified with a PHY Port address to join status polling. So, the UTOPIA extension(M) should only select the UTOPIA addresses that are related to active traffic to join polling. There are two ways to control UTOPIA status polling: one is static polling control and the other is dynamic polling control. The UTOPIA address polling control module 36 shown in FIG. 6.

Static polling control enables the UTOPIA addresses that correspond to the specified PHY devices without considering traffic status. Dynamic polling control only enables the UTOPIA addresses that are related to active traffic. The advantage of static polling control is that PHY status can be polled before a cell is ready to be transmitted and it is efficient for the applications in which one PHY device has only one PHY port. When one PHY device is associated with multiple PHY ports and traffic dynamically corresponds to different UTOPIA addresses, such as a switch fabric port, dynamic polling control can be the better solution.

Static polling control can be implemented by configuration signals or a configuration ATM cell (or packet in the case of UTOPIA packet extension) that carries configuration information in its payload.

At the UTOPIA transmit interface of the UTOPIA extension (M), dynamic polling control is based on the status of the queues in UTOPIA outlet buffer. A UTOPIA address is enabled to join polling only when a related queue in the UTOPIA outlet buffer is not empty.

At the UTOPIA receive interface of the UTOPIA extension (M), dynamic polling control is based on an RxAddr bitmap register in the UTOPIA address polling control module. The RxAddr bitmap register is dynamically updated by the information carried by RxAddr bitmap control link cell described above with reference to FIG. 10.

The RxAddr bitmap control link cell is generated by the UTOPIA extension (S) when ATM layer device (or the LINK layer device) which is connected to the UTOPIA extension (S) adds new UTOPIA receive addresses to join polling, or removes active UTOPIA receive addresses from polling status. The UTOPIA extension (S) always detects the polling status for each UTOPIA receive address.

Since the UTOPIA extension (S) emulates a PHY layer device, it needs to decide if it should drive TxClav and RxClav for the UTOPIA address on the TxAddr bus and the RxAddr bus. The UTOPIA extension (S) can be configured to drive TxClav and RxClav for selected UTOPIA addresses. The configuration can be controlled by a configuration control ATM cell (or packet) as described above with regard to other configurations.

As suggested above, transmission error control is realized by using Cyclic Redundancy Check (CRC). The UTOPIA extension devices only transfer data link cells with correct CRC checksums from the transmission cloud interface to the UTOPIA interface. All control link cells and idle link cells are also checked by CRC when they are received by a UTOPIA extension device. To reduce the effect of control link cell loss, it is preferred that a control link cell be transmitted twice.

The UTOPIA interface extension devices can support very large numbers of PHY layer ports by adapting multiple Clav/Enb* signals and increasing the UTOPIA address bus width. No matter how many PHY ports a UTOPIA interface supports, the UTOPIA extension device can always extend the UTOPIA interface across any kind of transmission cloud, because there is no PHY Port address transfer limitation in the UTOPIA extension's link control protocol.

There have been described and illustrated herein several embodiments of methods and apparatus for extending the range of a UTOPIA interface. While particular embodiments of the invention have been described, it is not intended that the invention be limited thereto, as it is intended that the invention be as broad in scope as the art will allow and that the specification be read likewise. Thus, while particular link cell formats have been disclosed, it will be appreciated that other similar formats could be utilized. Also, while the buffers have been shown as four discrete modules, it will be recognized that the buffers could be implemented in a single block of RAM using a link list for organization. It will therefore be appreciated by those skilled in the art that yet other modifications could be made to the provided invention without deviating from its spirit and scope as so claimed.

What is claimed is:

1. An apparatus for extending the transmission range of a UTOPIA interface, said apparatus comprising:
   a) a first UTOPIA extension device, said first UTOPIA extension device having
      a-i) a first UTOPIA interface emulator adapted to be coupled to one of an ATM layer device, and a LINK layer device,
      a-ii) a first link controller coupled to said first UTOPIA interface emulator,
      a-iii) a first media transceiver coupled to said first link controller and adapted to be coupled to a transmission cloud; and
   b) a second UTOPIA extension device, said second UTOPIA extension device having
      b-i) a second UTOPIA interface emulator adapted to be coupled to a PHY layer device,
      b-ii) a second link controller coupled to said second UTOPIA interface emulator, and
      b-iii) a second media transceiver coupled to said second link controller and adapted to be coupled to said transmission cloud, wherein
      said second link controller cooperates with said first link controller to control the flow of data between the PHY layer device and the one of an ATM layer device and a LINK layer device.

2. The apparatus of claim 1, wherein:

said first UTOPIA extension device further includes a-iv) a first UTOPIA inlet buffer coupled to said first UTOPIA interface and said first link controller; and a-v) a first UTOPIA outlet buffer coupled to said first UTOPIA interface and said first link controller, wherein said first UTOPIA inlet buffer and said first UTOPIA outlet buffer are used for traffic management.

3. The apparatus of claim 2, wherein:

said first UTOPIA extension device further includes a-vi) a first clock decoupling buffer coupled to said first UTOPIA inlet buffer and said first link controller; and a-vii) a second clock decoupling buffer coupled to said first UTOPIA outlet buffer and said first link controller, wherein said first clock decoupling buffer and said second clock decoupling buffer allow said first UTOPIA interface emulator and said first link controller to operate in different clock domains.

4. The apparatus according to claim 2, wherein:

said first link controller transmits a backpressure indication to the media transceiver for transmission over the transmission cloud when the first UTOPIA outlet buffer reaches a determined fullness.

5. The apparatus according to claim 4, wherein:

said first UTOPIA outlet buffer contains a plurality of queues, each queue associated with a PHY port address, and said first link controller transmits a backpressure indication for each queue when the fullness of the queue reaches a determined level.

6. A method for extending the transmission range of a UTOPIA interface, said method comprising:

a) receiving data locally from one of an ATM layer device or a LINK layer device via local UTOPIA interface;

b) buffering the data;

c) packaging the data in a data link cell;

d) transmitting the data link cell via a transmission cloud to a remote UTOPIA interface;

e) extracting the data from the data link cell at the remote UTOPIA interface; and f) forwarding the extracted data to a PHY layer device which is locally coupled to the remote UTOPIA interface.

7. The method according to claim 6, further comprising:

g) buffering the extracted data prior to forwarding it.

8. The method according to claim 7, further comprising:

h) monitoring the fullness of the buffer containing the extracted data; and i) transmitting a backpressure message from the remote UTOPIA interface to the local UTOPIA interface when the fullness of the buffer containing the extracted data reaches a determined level.

9. An apparatus for extending the transmission range of a UTOPIA interface, comprising:

a) a PHY layer device emulator, said PHY layer device emulator including a UTOPIA interface adapted to be coupled to one of an ATM layer device and a LINK layer device, and a media transceiver adapted to be coupled to a transmission cloud;

b) an ATM/LINK layer device emulator, said ATM/LINK layer device emulator including a UTOPIA interface adapted to be coupled to a PHY layer device, and a media transceiver adapted to be coupled to the transmission cloud, wherein data passing from the one of an ATM layer device and a LINK layer device to the PHY layer device emulator is repackaged and transmitted to the ATM/LINK layer device emulator via the transmission cloud in such a manner that the PHY layer device coupled to the ATM/LINK layer device emulator appears to be directly coupled to the one of an ATM layer device and a LINK layer device, and data passing from the PHY layer device to the ATM/LINK layer device emulator is repackaged and transmitted to the PHY layer device emulator via the transmission cloud in such a manner that the ATM/LINK layer device coupled to the PHY layer device emulator appears to be directly coupled to the PHY layer device.

10. An apparatus for extending the transmission range of a UTOPIA interface, said apparatus comprising:

a) a first UTOPIA extension device, said first UTOPIA extension device having a-i) a first UTOPIA interface emulator adapted to be coupled to a PHY layer device, a-ii) a first link controller coupled to said first UTOPIA interface emulator, and c-iii) a first media transceiver coupled to said second link controller and adapted to be coupled to said transmission cloud, wherein said first link controller operates to control the flow of data between the PHY layer device and a remotely located ATN/LINK layer device by transmitting backpressure information to the remotely located ATN/LINK layer device.

* * * * *